United States Patent
Kohlhase et al.

(10) Patent No.: US 9,345,191 B2
(45) Date of Patent: May 24, 2016

(54) SELF-PROPELLED HARVESTING MACHINE HAVING A VERTICALLY CONTROLLED HEADER

(71) Applicant: CLAAS SELBSTFAHRENDE ERNTEMASCHINEN GMBH, Harsewinkel (DE)

(72) Inventors: Martin Kohlhase, Harsewinkel (DE); Andreas Weilenberg, Herford (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 266 days.

(21) Appl. No.: 13/905,443

(22) Filed: May 30, 2013

(65) Prior Publication Data
US 2014/0000230 A1   Jan. 2, 2014

(30) Foreign Application Priority Data
Jun. 28, 2012   (DE) .......................... 10 2012 012 907

(51) Int. Cl.
*A01D 41/14* (2006.01)
*A01D 34/00* (2006.01)

(52) U.S. Cl.
CPC ............ *A01D 34/008* (2013.01); *A01D 41/141* (2013.01)

(58) Field of Classification Search
USPC ........... 56/10.2 E, 15.1, 15.2, 15.7–15.9, 17.1
See application file for complete search history.

(56) References Cited

U.S. PATENT DOCUMENTS

| | | | | |
|---|---|---|---|---|
| 4,136,508 A | * | 1/1979 | Coleman et al. ................ | 56/208 |
| 4,414,792 A | * | 11/1983 | Bettencourt et al. ........ | 56/10.2 E |
| 4,942,724 A | | 7/1990 | Diekhans et al. | |
| 5,455,769 A | * | 10/1995 | Panoushek et al. ............. | 701/50 |
| 2003/0000193 A1 | * | 1/2003 | Beck et al. ................ | 56/10.2 E |
| 2008/0155953 A1 | * | 7/2008 | Cleodolphi ................ | 56/10.2 E |

FOREIGN PATENT DOCUMENTS

DE    38 07 610    9/1989

* cited by examiner

*Primary Examiner* — Alicia Torres
(74) *Attorney, Agent, or Firm* — Michael J. Striker

(57) ABSTRACT

A self-propelled harvesting machine includes a header, a hydraulic adjusting mechanism for adjusting the cutting height of the header, a height sensor for detecting the cutting height, a pressure sensor for detecting the hydraulic pressure at the adjusting mechanism and a control unit for actuating the adjusting mechanism on the basis of values measured by the height sensor and the pressure sensor. The control unit has a first control loop for generating a height-correction signal ($h_{korr}$) on the basis of the actual cutting height ($h_{ist}$) detected by the height sensor (10) and a setpoint cutting height ($h_{soll}$) and, a second control loop for regulating pressure at the adjusting mechanism, the setpoint value of which follows changes in the height-correction signal.

8 Claims, 2 Drawing Sheets

SELF-PROPELLED HARVESTING MACHINE HAVING A VERTICALLY CONTROLLED HEADER

CROSS-REFERENCE TO A RELATED APPLICATION

The invention described and claimed hereinbelow is also described in German Patent Application DE 10 2012 012 907.6, filed on Jun. 28, 2012. This German Patent Application, subject matter of which is incorporated herein by reference, provides the basis for a claim of priority of invention under 35 U.S.C. 119(a)-(d).

BACKGROUND OF THE INVENTION

The invention relates to a self-propelled harvesting machine such as a combine harvester, a forage harvester, a baler or the like, comprising a header that is adjusted relative to a body of the harvesting machine with the aid of an adjusting mechanism in order to cut and recover crop at a substantially consistent height above the ground even when the ground on which the crop stands and on which the harvesting machine moves is uneven.

In conventional harvesting machine, such as that disclosed in DE 38 07 610 A1, the header or the cutting disc is equipped at both lateral ends thereof with sensing bands. The sensing bands swivel about an axis and are elastically pressed against the ground, and the position of the sensing bands provide information about the distance of the header above the ground contacted by the sending bands, wherein a height sensor is provided in each case for detecting this distance. A right and a left adjusting mechanism support the header at the body. A potentiometer is coupled to each of these adjusting mechanisms, the position of which is dependent on the supporting force exerted upon the header by the respective adjusting mechanism. The supporting force is constant as long as the harvesting machine moves on even terrain.

In reality, the ground on which the harvesting machine moves is more or less uneven. If the ground has a raised area, the dimensions of which are small transversely to the direction of travel, the front edge of the header may impact the raised area without the raised area having been detected by one of the ground sensing bands. The header also may impact the ground if the raised area is so steep that the front edge of the header impacts the raised area before one of the ground sensing bands has reached the raised area and has been deflected thereby.

Whenever the header contacts a raised area on the ground, the supporting force exerted by the adjusting mechanisms on the header is reduced. This reduction is detected with the aid of ground pressure potentiometers disposed on the adjusting mechanisms. A control device receives an actual-value signal, which is additively composed of measurement signals of the height sensors and the ground pressure potentiometer, wherein the control device actuates a hydraulic adjusting mechanism on the basis of this signal. The additive superposition of the signals from height sensors and ground pressure potentiometers makes it possible to track the header in such a way that the raised area on the ground is negotiated even when this raised area on the ground is not detected by the height sensors.

A problem of this conventional harvesting machine, however, is that tilting motions that the harvesting machine undergoes when traveling over uneven terrain also have a considerable effect on the supporting forces detected by the ground pressure potentiometers. But such titling motions are not initiated until the wheels of the harvesting machine roll over the uneven terrain, i.e., when the header has already passed the uneven terrain. If the control unit attempts to counteract the supporting-force fluctuations caused by such a tilting motion, there is a risk that resultant vertical deflections of the header could, in turn, lead to ground contact or, in the most favorable case, to unwanted cutting-height fluctuations once the uneven terrain has been negotiated.

In order to prevent this risk, the reaction rate of the conventional control unit must not be too high. But the lower the reaction rate is, the greater the likelihood is that the header will contact a raised area on the ground. This is because the height of the raised area on the ground could not be tracked in a timely manner even if the raised area on the ground was detected by the ground sensing bands. Therefore, the best that can be achieved by means of the conventional technology is to reach a compromise between the contradictory requirements on stability and high reaction rate.

For that matter, the comparators used in the conventional control circuit have only two starting states and, therefore, the valves that are controlled by the comparators and which supply the actuating mechanisms with hydraulic fluid are either open or closed. When the vehicle approaches a dip in the ground and the ground sensing bands detect an increase in the cutting height, the header must be lowered. To this end, when the control circuit opens valves (via which the hydraulic fluid flows out of the adjusting mechanisms), the result is an extreme reduction in pressure, which is initially indistinguishable at the ground pressure potentiometers from load relief caused by the header impacting the ground. In order to counteract this load relief, the control circuit must raise the header and, as a result, the reaction to the change in cutting height is delayed.

SUMMARY OF THE INVENTION

The present invention overcomes the shortcomings of known arts, such as those mentioned above.

The invention provides a harvesting machine and a method for controlling the header of a harvesting machine that make it possible to combine the requirements on stability and high reaction rate with one another in a better way than has been possible in the conventional arts.

In an embodiment, the invention provides a self-propelled harvesting machine comprising a header, at least one hydraulic adjusting mechanism for adjusting the cutting height of the header, at least one height sensor for detecting the cutting height, at least one pressure sensor for detecting the hydraulic pressure at the adjusting mechanism and a control unit for actuating the adjusting mechanism on the basis of values measured by the height sensor and the pressure sensor. The control unit is divided into a first control loop for generating a height-correction signal on the basis of the actual cutting height detected by the height sensor and, a second control loop, the setpoint value of which follows changes in the height-correction signal.

When an adjustment is required, the pressure acting at the hydraulic actuating mechanism is tracked very rapidly without destabilizing the header. This is because a pressure increase or decrease does not immediately result in a proportional change in height of the header, but merely determines the rate at which the hydraulic fluid flows toward the adjusting mechanism or out of the adjusting mechanism, thereby determining the rate at which the height of the header changes. In addition, tilting motions of the harvesting machine and resultant fluctuations of the actual pressure are compensated without this affecting the first control loop. The risk that the height-correction signal will become instable due to rapid control of the pressure is therefore eliminated.

A rapid, marked reaction by the second control loop to setpoint-value deviations of the pressure is by designing the second control loop as a proportional controller. The first control loop, however, can be advantageously designed as a proportional and integral controller, or the first control loop can be switched between a proportional controller mode and a proportional and integral controller mode.

Preferably, the first control loop has a feedback input, which is connected to the output of the second control loop and is designed to freeze an integral component of the height-correction signal when the pressure-correction signal output by the second control loop reaches a specified limit value. This accounts for the fact that, when a valve actuated by means of the pressure-correction signal has reached a completely open state, a further increase in the height-correction signal via the integral component thereof can no longer induce acceleration of the displacement of the adjusting mechanism.

If a further increase of the integral component is permitted in this state, then this integral component must be gradually reduced once more at a later point in time, and the valve reaction delayed by a certain amount when the pressure-correction signal falls below the limit value once more. Such a delay can be prevented or at least limited by freezing the integral component.

The second control loop preferably controls the adjusting mechanism by means of at least one proportional valve, i.e. a valve having a volume resistance that is proportional to the pressure-correction signal that is applied.

In order to minimize the time delay between a change in the pressure-correction signal and the reaction of the proportional valve thereto, it is advantageous for the proportional valve to be biased in the closed state.

Users are able to adjust the setpoint cutting height of the header at an input means. Such an input means enables users to make very abrupt changes in the setpoint cutting height, which, in turn results in rapid changes in the pressure at the adjusting mechanism. Once the new setpoint cutting height is reached, if the outflow or inflow of hydraulic fluid at the adjusting mechanism is abruptly stopped, the resultant delay of the adjusting mechanism can result in extreme pressure spikes. Such extreme pressure spikes stress the material and can result in tilting motions of the machine. In order to avoid these, a setpoint cutting-height input of the first control loop is advantageously connected to the input means via a low-pass filter.

The invention also provides a method for controlling a header of a self-propelled harvesting machine. The method includes
a) detecting the actual cutting height of the header and deriving a height-correction signal on the basis of the actual cutting height and a setpoint cutting height;
b) detecting the actual pressure at a hydraulic adjusting mechanism that supports the header and deriving a pressure-correction signal on the basis of the actual pressure, a setpoint pressure, and the height-correction signal;
c) regulating the pressure at the hydraulic adjusting mechanism on the basis of the pressure-correction signal.

In step c), the throughput of at least one proportional valve is preferably controlled in proportion to the pressure-correction signal.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

The following is a detailed description of example embodiments of the invention depicted in the accompanying drawing. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
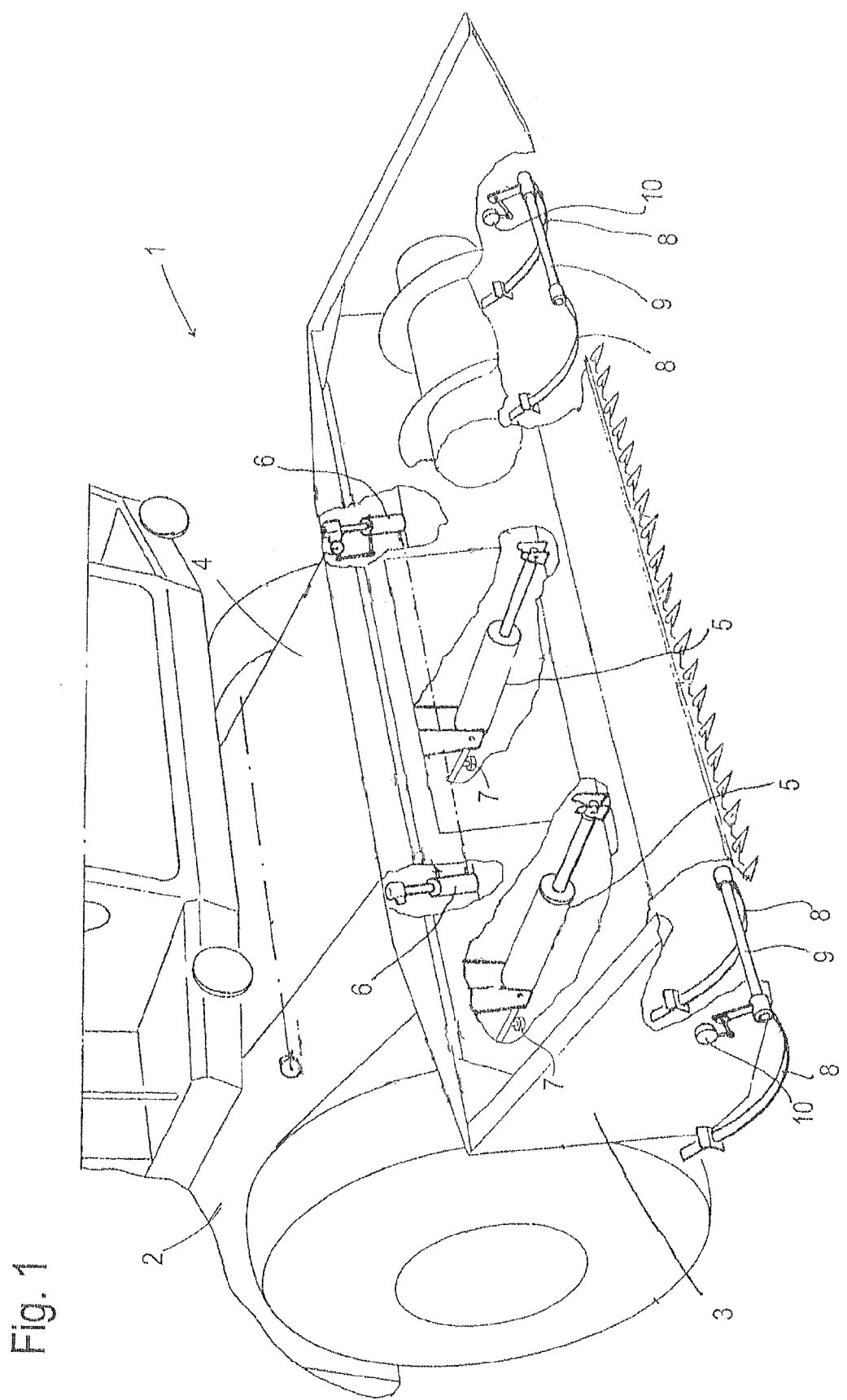
FIG. 1 depicts a self-propelled harvesting machine according to the invention in a sectional, perspective view.

FIG. 1 depicts a self-propelled harvesting machine 1 (in the form of a combine harvester), constructed according to the invention, in a sectional, perspective view. As shown therein is a front part of a body 2 and a header 3, which is connected to the body 2 via a feed rake 4. The slant of the feed rake and, therefore, the height of the header 3 above the ground is adjusted with the aid of two hydraulic adjusting mechanisms 5, which engage at the body 2 at one end and, and at the other end, engage at a front end of the feed rake 4.

Pressure sensors 7 are disposed at supply lines leading to the adjusting mechanisms 5 or directly to a chamber of each adjusting mechanism 5 in order to detect the pressure of the hydraulic fluid in the chambers of the adjusting mechanisms 5. Further adjusting mechanisms 6 are disposed between the feed rake 4 and the header 3 in a manner known per se in order to swivel the header 3 about a non-illustrated axis extending in the direction of travel.

Sensing bands 8, which protrude downwardly, are mounted on a left side and a right side of the header 3 underneath a track shoe in a manner pivotable about an axis defined by a shaft 9. The track shoe is shown partially cut away in order to highlight the sensing bands 8. Height sensors 10 are coupled at both sides of the header 3 to the shafts 9 in order to detect the distance of the header 3 from the ground on the basis of the position of the sensing bands 8.

Figure 2:
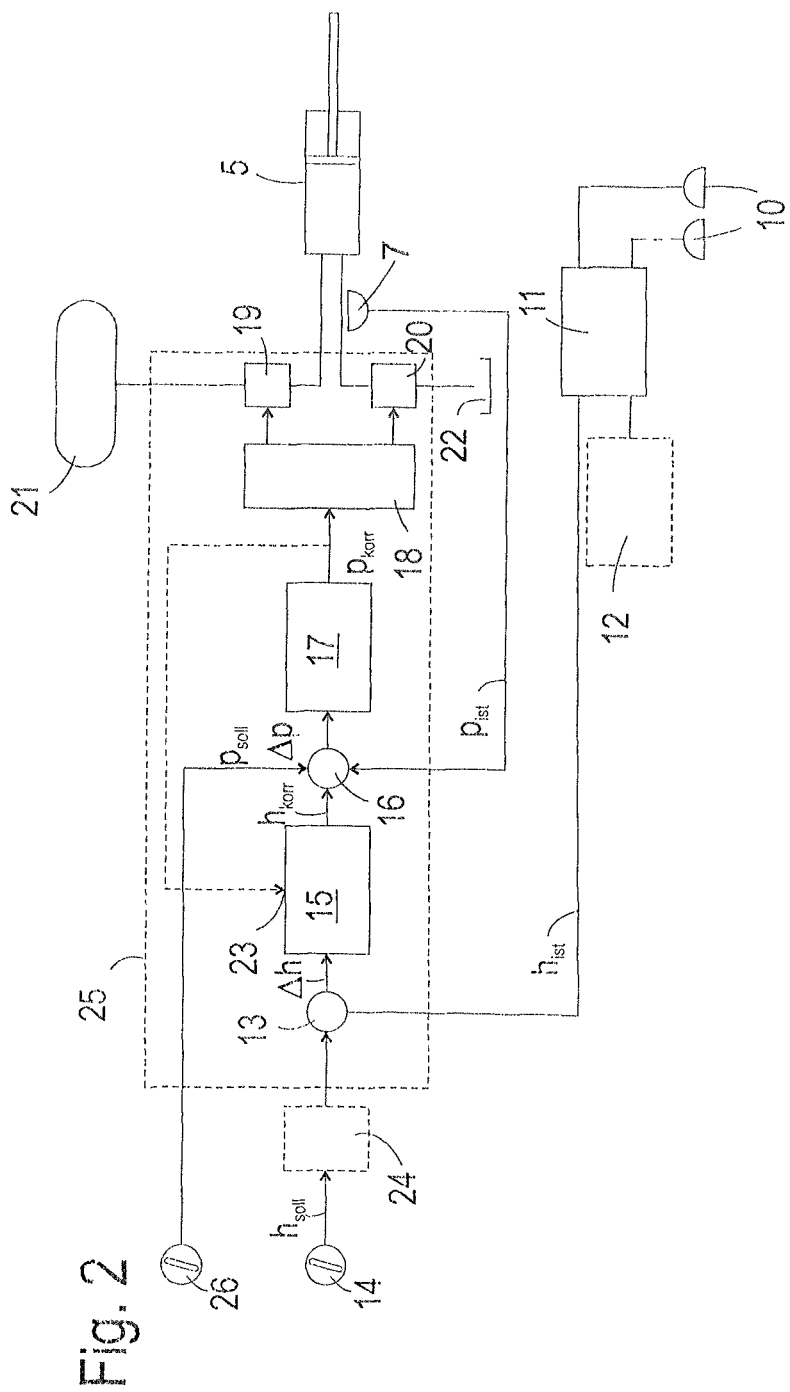
FIG. 2 depicts a block diagram of a control device for controlling the height of the header of the harvesting machine.

FIG. 2 shows a block diagram of a control unit 25, which evaluates the signals of the sensors 7, 10 in order to control the adjusting mechanisms 5. The right and left height sensors 10 are connected to a first arithmetic logic unit 11, which calculates a mean of the values, which may differ, measured by the two sensors 10 and outputs this mean (as the actual cutting height $h_{ist}$), to the control unit 25 via a first output. The arithmetic logic unit 11 also can have a second output for a signal derived from the difference of the values measured by the height sensors 10. The signal is used by a control unit 12, in order to actuate the adjusting mechanisms 6 and thereby drive a rotation of the header 3 about the axis parallel to the direction of travel that minimizes the difference between the values measured by the height sensors 10.

The control unit 25 can be a microprocessor in which the sub-units of the control unit 25, which are described in the following, are each implemented in the form of subroutines. Alternatively, the sub-units or at least a few thereof can be designed as discrete circuits.

An arithmetic circuit 13 that calculates differences (such as an operational amplifier), receives the actual cutting-height signal $h_{ist}$ from the arithmetic logic unit 11 and a setpoint cutting-height signal $h_{soll}$, set by the driver of the harvesting machine at an input means 14 installed in the driver's cab. The difference $\Delta h = h_{ist} - h_{soll}$ is forwarded by the arithmetic circuit 13 to a first control loop 15. The first control loop is designed here as a PI controller, which delivers a height-correction signal having a proportional component and an integral component in the form $$h_{korr} = a\Delta h + b\int \Delta h \, dt,$$

wherein a, b are suitably defined constants. Further terms, which are dependent on $\Delta h$ in a non-proportional or non-integral manner, can be contained in the height-correction signal.

In a further arithmetic circuit 16, a difference between the height-correction signal $h_{korr}$ and a pressure actual-value $p_{ist}$ delivered by the pressure sensors 7 of the adjusting mechanisms 5 is calculated and transferred as a pressure-deviation signal $\Delta p$ to a second control loop 17.

The second control loop 17, which converts the pressure-deviation signal $\Delta p$ to a pressure-correction signal $p_{korr}$, is designed as a proportional controller or substantially so, in order to track the pressure-correction signal $p_{korr}$ of every change in the actual pressure $p_{ist}$ or the height-correction signal $h_{korr}$ at a high rate of speed.

A valve driver circuit 18 is connected to the output of the second control loop 17 in order to receive the pressure-correction signal $p_{korr}$. On the basis of the pressure-correction signal $p_{korr}$, the valve driver circuit 18 controls two proportional valves 19, 20, one 19 of which is disposed between a high-pressure reservoir 21 and one of the adjusting mechanisms 5, and the other 20 of which is disposed between the adjusting mechanism 5 and a pressureless tank 22 for hydraulic fluid. The pressure sensor 7 is shown at a line section between the adjusting mechanism 5 and the proportional valve 20. The pressure sensor 7 also could be located at a line section between the proportional valve 19 and the adjusting mechanism 5 or directly at a chamber of the adjusting mechanism 5.

The proportional valves 19, 20 are solenoid valves. The extent of opening of the proportional valves is dependent on the current intensity supplied thereto by the valve driver circuit 18. Provided this current intensity is less than a lower limit current intensity dependent on the configuration of the valves 19, 20, the valves 19, 20 are closed. If the limit current intensity is exceeded, the fluid throughput of the valves 19, 20 increases continuously with the current intensity. If $p_{korr}=0$, the driver circuit 18 holds both valves 19, 20 closed, but acts upon both with the limit current intensity. Consequently, when $P_{korr}$ deviates from 0, the first thing that happens is not that a magnetic field must be established in the valve 19, 20 to be opened and the inductance of the solenoid valves delays the increase in the supplied current intensity, but rather that the extent of opening of the valve 19 or 20 can follow a change of the supplied current intensity with minimal delay.

Therefore, the driver circuit 18 opens the valve 19 when $p_{korr}>0$, while the valve 20 remains closed. A resultant flow of the hydraulic fluid from the high-pressure reservoir 21 induces a rapid increase in pressure in the adjusting mechanism 5 and, if this continues for a relatively long period of time, causes the adjusting mechanism 5 to extend and the header 5 to be raised. Conversely, if $p_{korr}<0$, the driver circuit 18 holds the valve 19 closed and opens the valve 20, and so the pressure at the adjusting mechanism 5 decreases rapidly, the adjusting mechanism 5 retracts, and the header 3 lowers.

There is an upper limit value of the current intensity supplied to the proportional valve 19, 20. At the upper limit value, the valve 19 or 20 is completely open and so a further increase in the current intensity does not result in a further increase in the flow through the valve. Accordingly, there is an upper, positive limit value $p_{korr,max}$ and a lower, negative limit value $p_{korr,min}$ for $P_{korr}$, which, if exceeded, do not affect the throughput of the valve 19 or 20. In the case of a sustained deviation between the setpoint and actual cutting height $h_{soll}$, $h_{ist}$, respectively, the integral component in the height-correction signal $h_{korr}$ of the first control loop 15 can become so great that $p_{korr}$ leaves the interval $[p_{korr,min}, p_{korr,max}]$ of these limit values.

If the sign of the cutting-height deviation $\Delta h$ changes at a later point in time, it may be a while until the integral component has decayed to the extent that $p_{korr}$ has returned to the interval. The valve 19 or 20 remains open to a maximum extent for this period of time. An overswing of the header 3 resulting from this delay is reduced by not assuming the weighting factor b of the integral term to be constant, as indicated above, but rather to be a function of the pressure-correction signal $p_{korr}$ traced back to a feedback input 23 of the first control loop 15. In the simplest case, b has a constant value that differs from 0, provided $p_{korr}$ is located within the interval $[p_{korr,min}, p_{korr,max}]$; and the value 0 when $p_{korr}$ is located outside this interval. In this manner, a change in the integral term also is frozen when $p_{korr}$ has reached the limits of the interval. Therefore, a change in the sign of $\Delta h$ immediately affects $p_{korr}$ and the extent of opening of the valves 19, 20.

The input means 14 (which can be a switch, a sliding regulator, or the like, for example), makes it possible for the driver to quickly switch the setpoint cutting height. In order to set the header 3 down and remove this from the harvesting machine 1, the setpoint cutting height must be set to 0, i.e., the header 3 must contact the ground. If the driver switches $h_{soll}$ to 0 at the input means 14 for this purpose while the header 3 is held above the ground, the height deviation $\Delta h$ abruptly jumps to a value that greatly differs from 0. Such condition rapidly affects the pressure-correction signal $p_{korr}$ via the proportional component in the output of the first control loop 15 and the second control loop 17, which functions substantially merely proportionally and causes the pressure-control signal $p_{korr}$ to become greatly negative.

The driver circuit 18 therefore opens the valve 20 wide and, the header 3 rapidly lowers. Once the header 3 has reached the ground, $\Delta h$ returns to 0. To prevent the header 3 from dropping to the ground unbraked in such a case, a low-pass filter 24 is provided between the input means 14 and the arithmetic circuit 13 in a preferred development. Regardless of how rapidly the switch of the setpoint height takes place at the input means 14, the low-pass filter 24 causes the setpoint value present at the input of the arithmetic circuit 13 to slowly approach the value set by the user. As a result, $\Delta h$ can assume very low values or even change signs before the header 3 has contacted the ground, with the consequence that it approaches the ground slowly and an abrupt impact is prevented.

The arithmetic circuit 16 further comprises an input for a setpoint pressure signal $P_{soll}$, which the driver sets at a second input means 26.

Provided the header 3 does not have ground contact, the influence of a setpoint pressure $p_{soll}$ that is set at the second input means 26 on the function of the control unit 25 is low. If the height $h_{ist}$ of the header 3 is below the setpoint value $h_{soll}$, the height-correction signal $h_{korr}$ increases continuously due to the integral component. As a result, $p_{korr}$ also increases until the pressure in the adjusting mechanism 5 is sufficient to lift the header 3. The time required for this at start-up of the control unit 25 is shortened by inputting a setpoint value $p_{soll}$ at the input of the arithmetic circuit, wherein this setpoint value approximately corresponds to the pressure required to hold the header in equilibrium. Setpoint value $p_{soll}$, however, does not affect the height of the header 3 that is ultimately set, and the reaction rate of the control unit does not depend on $p_{soll}$ while operation is underway. Only when the setpoint cutting height is set to $h_{soll}=0$ and the header 3 has ground contact can the pressure exerted by the header 3 on the ground be regulated with the aid of $p_{soll}$. At the same time, in this operating state, the first control loop can be switched from a proportional and integral operating mode to a proportional operating mode.

REFERENCE CHARACTERS 1 harvesting machine
2 body
3 header
4 feed rake
5 adjusting mechanism
6 adjusting mechanism
7 pressure sensor
8 sensing band
9 shaft
10 height sensor
11 arithmetic logic unit
12 control unit
13 differential connection (arithmetic circuit)
14 input means
15 1st control loop
16 arithmetic circuit
17 2nd control loop
18 valve driver circuit
19 proportional valve
20 proportional valve
21 high-pressure reservoir
22 tank
23 feedback input
24 low-pass filter
25 control unit
26 input means As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A self-propelled harvesting machine (1), comprising:
   a header (3),
   at least one hydraulic adjusting mechanism (5) for adjusting the cutting height of the header (3),
   at least one height sensor (10) for detecting the cutting height,
   at least one pressure sensor (7) for detecting a hydraulic pressure actual value ($p_{ist}$) at the adjusting mechanism (5),
   a control unit (25) for actuating the adjusting mechanism (5) on the basis of values measured by the height sensor (10) and the pressure sensor (7), wherein the control unit (25) comprises a first control loop (15) for generating a height-correction signal ($h_{korr}$) on the basis of the cutting height ($h_{ist}$) detected by the height sensor (10) and a setpoint cutting height ($h_{soll}$), and
   a second control loop (17), designed as a proportional controller, for regulating the pressure at the adjusting mechanism (5),
   wherein a setpoint value of the second control loop (17) is controlled to follow changes in the height-correction signal,
   wherein the first control loop (15) is switched between a proportional controller operating mode and a proportional and integral controller operating mode,
   wherein the first control loop (15) has a feedback input (23) that is connected to the output of the second control loop (17) and is designed to freeze an integral component of the height-correction signal ($h_{korr}$) when a pressure-correction signal ($p_{korr}$) reaches a specified limit value, and
   wherein an arithmetic circuit calculates and transfers a difference between the height correction signal ($h_{korr}$) and the pressure actual-value ($p_{ist}$) as a pressure-deviation signal ($\Delta p$) to the second control loop, which second control loop converts the pressure-deviation signal ($\Delta p$) to the pressure-correction signal ($p_{korr}$).

2. The self-propelled harvesting machine according to claim 1, wherein the second control loop (17) has a shorter reaction time than the first control loop (15).

3. A self-propelled harvesting machine (1), comprising:
   a header (3),
   at least one hydraulic adjusting mechanism (5) for adjusting the cutting height of the header (3),
   at least one height sensor (10) for detecting the cutting height,
   at least one pressure sensor 7 for detecting a hydraulic pressure actual value ($p_{ist}$) at the adjusting mechanism (5),
   a control unit (25) for actuating the adjusting mechanism (5) on the basis of values measured by the height sensor (10) and the pressure sensor (7), wherein the control unit (25) comprises a first control loop (15) for generating a height-correction signal ($h_{korr}$) on the basis of the cutting height ($h_{ist}$) detected by the height sensor (10) and a setpoint cutting height ($h_{soll}$), and
   a second control loop (17), designed as a proportional controller, for regulating the pressure at the adjusting mechanism (5),
   wherein a setpoint value of the second control loop (17) is controlled to follow changes in the height-correction signal,
   wherein the first control loop (15) has a feedback input (23) that is connected to the output of the second control loop (17) and is designed to freeze an integral component of the height-correction signal ($h_{korr}$) when a pressure-correction signal ($p_{korr}$) reaches a specified limit value,
   wherein an arithmetic circuit calculates and transfers a difference between the height correction signal ($h_{korr}$) and the pressure actual-value ($p_{ist}$) as a pressure-deviation signal ($\Delta p$) to the second control loop, which second control loop converts the pressure-deviation signal ($\Delta p$) to the pressure-correction signal ($p_{korr}$), and
   wherein the first control loop (15) is a proportional and integral controller.

4. The self-propelled harvesting machine according to claim 1, wherein the second control loop (17) actuates the adjusting mechanism (5) via at least one proportional valve (19, 20).

5. The self-propelled harvesting machine according to claim 4, wherein the proportional valve (19, 20) is biased in the closed state.

6. The self-propelled harvesting machine according to claim 1, wherein an input means (14) used to set the setpoint cutting height ($h_{soll}$) by an operator, and a setpoint cutting-height input of the first control loop (15) are connected via a low-pass filter (24).

7. A method for controlling a header (3) of a self-propelled harvesting machine (1), comprising steps of:
- detecting a cutting height ($h_{ist}$) of the header (3) and deriving a height-correction signal ($h_{korr}$) on the basis of the actual cutting height and a setpoint cutting height ($h_{soll}$);
- detecting a hydraulic pressure actual value ($p_{ist}$) at a hydraulic adjusting mechanism (5) that supports the header (3);
- using a first control loop, deriving a pressure-correction signal ($p_{korr}$) on the basis of the hydraulic pressure actual value ($p_{ist}$), a setpoint pressure ($p_{soll}$), and the height-correction signal ($h_{korr}$);
- calculating and transferring a difference between the height correction signal ($h_{korr}$) and the hydraulic pressure actual value ($p_{ist}$) as a pressure deviation signal ($\Delta p$) to a second control loop, designed as a proportional controller, wherein the second control loop converts the pressure deviation signal ($\Delta p$) to the pressure-correction signal ($p_{korr}$); and
- regulating the pressure at the hydraulic adjusting mechanism (5) on the basis of the pressure-correction signal ($p_{korr}$).

8. The method according to claim 7, wherein the step of regulating includes controlling a throughput of at least one proportional valve (19, 20) in proportion to the pressure-correction signal ($p_{korr}$).

\* \* \* \* \*